US008375137B2

(12) United States Patent
Bowman

(10) Patent No.: US 8,375,137 B2
(45) Date of Patent: Feb. 12, 2013

(54) SYSTEM AND METHOD FOR STREAMING AUDIO USING A SEND QUEUE

(75) Inventor: Timothy D. Bowman, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 185 days.

(21) Appl. No.: 12/507,754

(22) Filed: Jul. 22, 2009

(65) Prior Publication Data

US 2010/0023639 A1 Jan. 28, 2010

Related U.S. Application Data

(60) Provisional application No. 61/082,807, filed on Jul. 22, 2008.

(51) Int. Cl.
*G06F 15/16* (2006.01)
(52) U.S. Cl. ........................................ 709/231; 709/219
(58) Field of Classification Search ........................ None
See application file for complete search history.

(56) References Cited

U.S. PATENT DOCUMENTS

| 5,586,264 | A  | * | 12/1996 | Belknap et al. | 709/231 |
| 5,640,597 | A  | * | 6/1997  | Noguchi et al. | 709/231 |
| 6,216,173 | B1 | * | 4/2001  | Jones et al. | 709/231 |
| 7,058,721 | B1 | * | 6/2006  | Ellison et al. | 709/231 |
| 7,142,509 | B1 | * | 11/2006 | Rovner et al. | 370/230 |
| 7,532,805 | B2 | * | 5/2009  | Okada et al. | 709/231 |
| 7,970,875 | B1 | * | 6/2011  | Shaffer et al. | 709/223 |
| 2005/0111662 | A1 | * | 5/2005 | Fiedler | 380/201 |

FOREIGN PATENT DOCUMENTS

| JP | 2004096684 A | * | 3/2004 |
| KR | 739320 B1 | * | 7/2007 |
| WO | WO 9854646 A2 | * | 12/1998 |

OTHER PUBLICATIONS

Lertsutthiwong et al. "Scalable Video Streaming for Single-Hop Wireless Networks Using a Contention-Based Access MAC Protocol." Advances in Multimedia. Hindawi Publishing Corp. Jan. 2008. vol. 2008, Issue 2, 21 pages.*
NN8607787. "Interface for Playing Back Recorded Audio Data." IBM Technical Disclosure Bulletin. Jul. 1, 1986. vol. 29, Issue 2. 4 pages.*
NB9002113. "Dynamic Reformatting and Merging of Data Streams." IBM Technical Disclosure Bulletin. Feb. 1, 1990. vol. 32, Issue 9B. 8 pages.*

* cited by examiner

*Primary Examiner* — Jeffrey R Swearingen
(74) *Attorney, Agent, or Firm* — Thorpe North & Western LLP

(57) ABSTRACT

A system and method are provided for preparing a streaming media system for initial presentation of a media stream. The system includes a media server configured to send out media packets for a media stream at periodic clocked intervals. A framer can be located with the media server to divide the media stream into media packets. A media client is also provided to receive the media packets for the media stream from the media server. A send queue can be located in the server. The send queue can be configured to store a defined length of programming from the media stream, and the send queue can immediately fill a client's user buffer when an activation event occurs.

20 Claims, 11 Drawing Sheets

SYSTEM AND METHOD FOR STREAMING AUDIO USING A SEND QUEUE

PRIORITY CLAIM

Priority is claimed to U.S. Provisional Patent Application Ser. No. 61/082,807, filed Jul. 22, 2008, which is hereby incorporated herein by reference in its entirety.

BACKGROUND

Wired and wireless networks are becoming a significant method for distributing media files and other information to end users. It is now possible to distribute music, video, games, and other multi-media information to computers, thin-clients, cell phones, and virtually any network capable device within a wireless or wired network.

Streaming of data files or "streaming media" refers to technology that delivers sequential content at a rate sufficient to present the media to a user at the originally anticipated playback speed without significant interruption. Streamed data may be stored in device memory until the data is played back and then the streamed data can be subsequently deleted. In most streaming systems, the user is able to start accessing the requested content without waiting for the entire media file to be completely transferred over the host network.

However, the audio/video quality that can be received for a streaming presentation can be constrained by the available bandwidth and latency of the network connection. The constrained bandwidth and latency may cause congestion of the streaming content, slowing down the reception of the requested content. Also, a network failure may prevent the reception of the streaming content. These deficiencies may impact the effectiveness of streaming as it delivers content on demand from previously recorded broadcasts or content from live broadcasts.

In particular, the streaming deficiencies may impact home automation networks. A home automation network connects electronic devices that control lighting, monitor appliances, provide high quality entertainment, Internet connections, and supply a multitude of functions for a home. In these home automation networks, media files can be streamed from a central controller to client devices or streams can be sent between devices. In situations where a stream is sent to multiple clients within a single building, the system can substantially synchronize the output of the media streams to avoid any noticeable delays that may be heard when the audio or video files are played simultaneously across multiple rooms.

DETAILED DESCRIPTION

Figure 1:
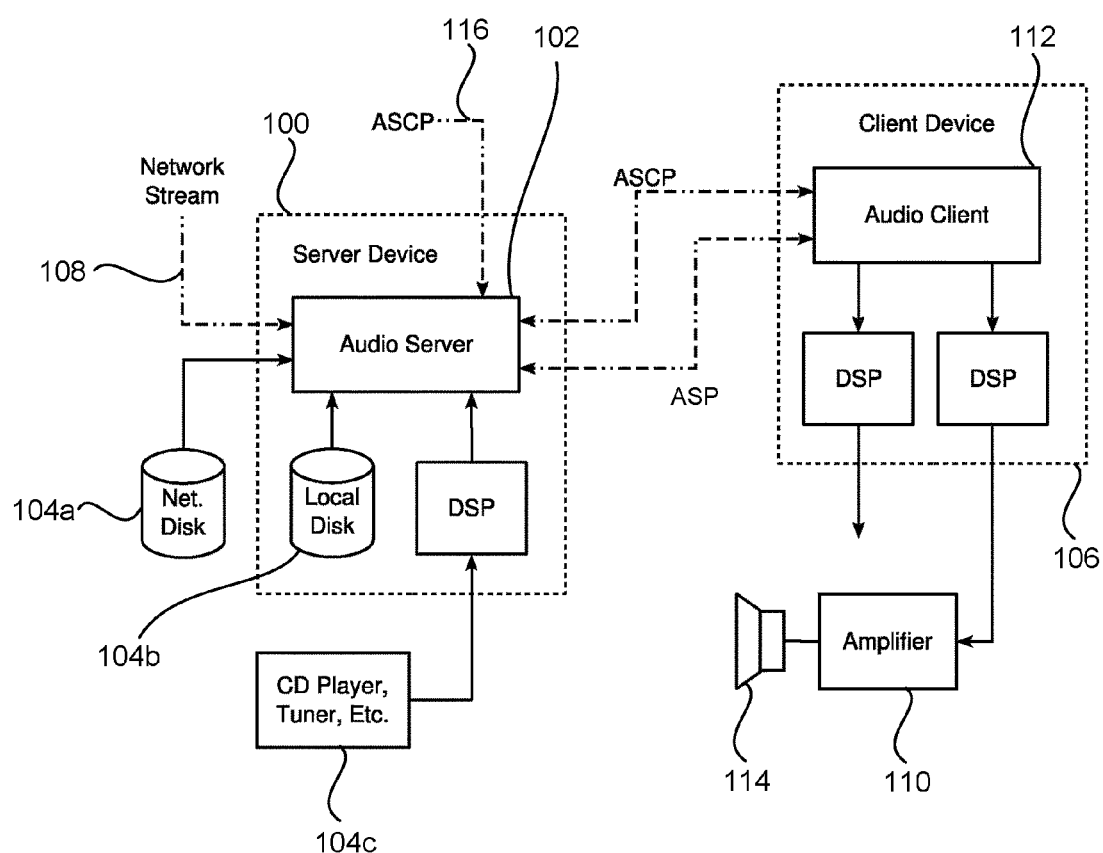
FIG. 1 is a block diagram illustrating selected components of a server device and client device in accordance with an embodiment.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method for audio streaming are provided to distribute audio media sources or streams to one or more audio clients, to ensure substantial synchronization of audio outputs when multiple clients are playing the same stream, and to provide basic stream transport and audio control commands. While this system will be described primarily as an audio system, other types of streaming media such as video, streaming computer graphics or other media streams can also be sent through the streaming system.

Two components of the system may be the audio server and audio client. FIG. 1 illustrates that the audio server 102 reads various kinds of audio sources 104*a-c*, divides the data into frames suitable for streaming over a network, and then sends the data stream or audio stream to one or more audio client devices 106. Then the audio stream can be played back using a signal output device such as an amplifier 110 and a speaker 114. The audio server can broadcast packets through a wireless or wired network, and software buffering can also be provided by the system. Several general types of media sources can be streamed by the audio server.

One type of media source may include an MP3, WMA, M4A, or another type of electronically encoded media file accessible as part of the file system of the computing platform 100 running the audio server software. Examples of sources are MP3 files stored on the local hard disk drive 104*b* of a media controller, M4A files on a USB stick drive inserted in a home theater controller, or songs on an iPod® mounted as a USB device on a speaker device or client device.

Another type of media source can be the audio inputs of any electronic device or computing product that provides media streams 104*c*, such as a Linux OSS (/dev/dspN) device. This capability makes it possible to distribute and synchronize the analog, digital, or optical outputs of devices like CD players and tuners when they are connected to a media controller, home theater controller, or audio output device. Such inputs may also include a microphone on a mini touch panel, which can be used to implement an intercom system. Another type of media source is a remote network stream 108, such as internet radio, which can be read by the audio server 102 and distributed to clients.

Audio frames can be sent to clients using Audio Stream Protocol (ASP), described in more detail later. Real-time Transport Protocol (i.e., RFC 3550) can be used to allow inter-operability between third party devices or software and audio servers and clients. Because of issues with User Datagram Protocol (UDP) on Wi-Fi networks, Transmission Control Protocol (TCP) is more effective for the network transport but UDP or other protocols may be used if the network conditions are appropriate. Real-Time Transport Protocol (RTP) is less suited for a streaming protocol such as TCP, and is preferably encapsulated in a wrapper protocol. RTP is also less suited to a real-time synchronization method and may need to use the Synchronized Source (SSRC) field to provide a high-resolution timestamp for clients, instead of the random source identifier used by the RTP specification. For this reason, and also to facilitate the streaming of multiple audio frames as a group, the ASP protocol may be used.

An audio client 112, as in FIG. 1, can be any computing device running audio client software and a device that has analog outputs, digital outputs, optical outputs, or media presentation outputs, and network connectivity. The audio client can receive ASP or RTP packets, decode the data if necessary, and send the data to an output device such as an amplifier 110 and speaker 114. The timing of the audio output may be adjusted by the client according to information sent by the server in the ASP or RTP header extension. This timing information can be calculated by the server based on the presentation rate of the media and the server's system clock.

The audio server and client do not generally handle high level tasks such as locating and scanning media, building playlists, or selecting a group of clients. These functions can be controlled by the audio driver on the system running a director software program and by using the Audio Server Control Protocol (ASCP) (discussed more later) 116. Both the server and client listen for connections on a pre-determined TCP port, and both the server and client can accept multiple connections. Server commands are available to set up client endpoints, load media, and operate the transport controls. Client commands are available for client-specific settings like volume or tone and for retrieving client status. The audio system may also be controlled by manually entering commands in a telnet terminal session.

The streaming system can also provide time synchronization. Every computing device running an audio client and/or server has a system clock that is synchronized with every other audio device on the local network using the Network Time Protocol (NTP) (i.e., RFC 1305).

Figure 2:
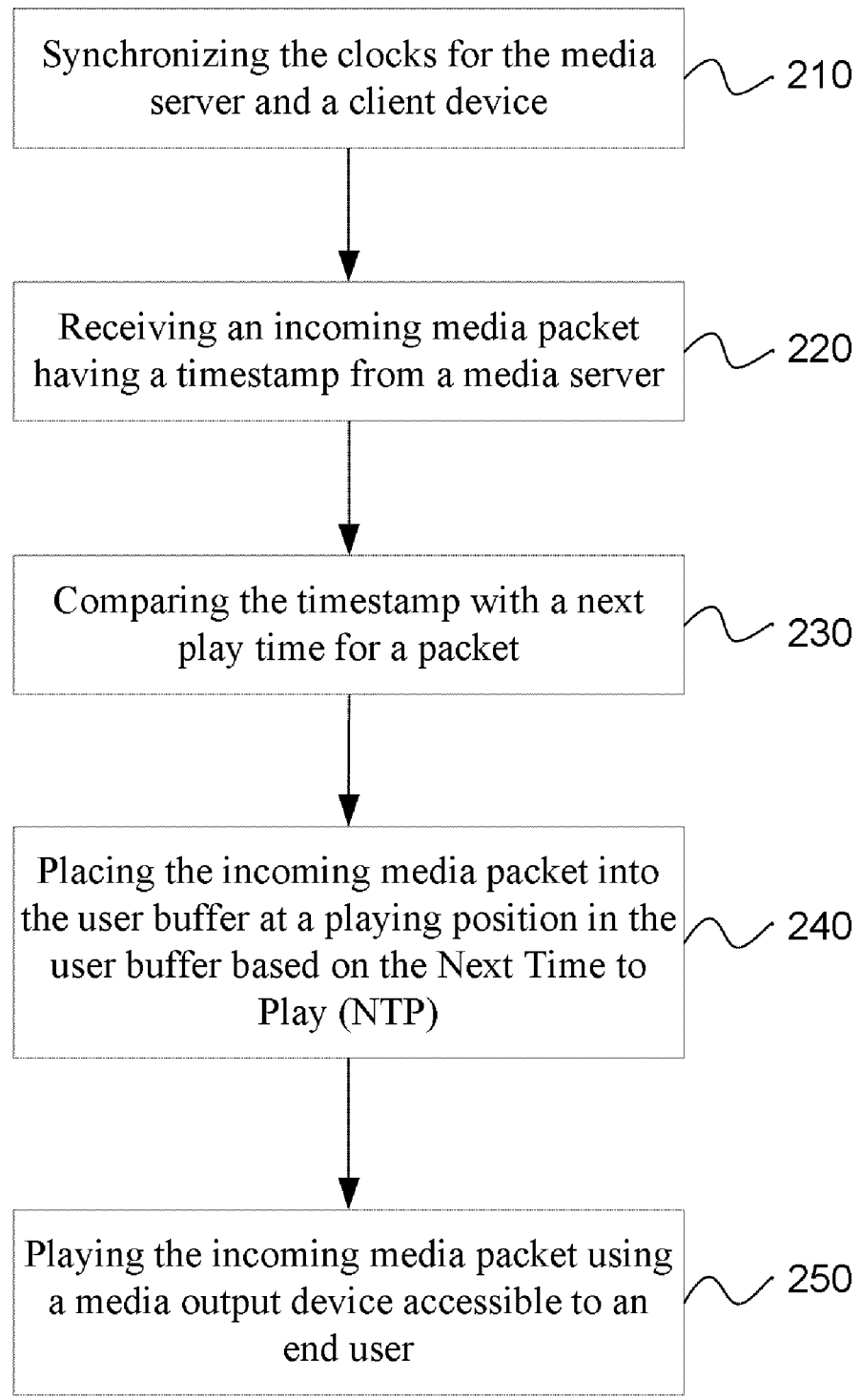
FIG. 2 is a flowchart of a method of synchronizing audio streaming in an embodiment.
Figure 3A:
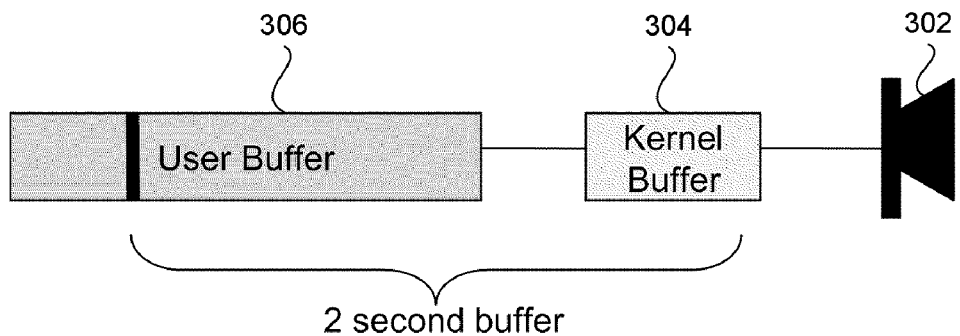
FIG. 3*a* is a block diagram illustrating a user buffer and a kernel buffer in an embodiment of a client device.
Figure 3B:
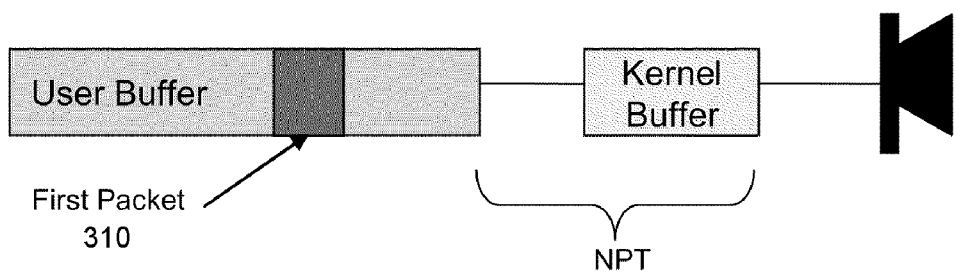
FIG. 3*b* is a block diagram illustrating a packet being inserted into a user buffer in an embodiment of a client device.
Figure 3C:
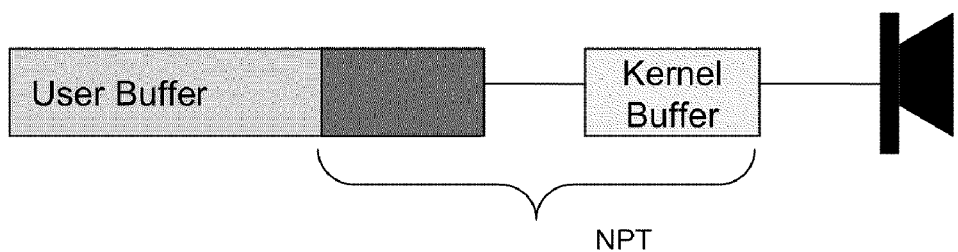
FIG. 3*c* is a block diagram illustrating a user buffer and a kernel buffer with a queue of audio packets in an embodiment of a client device.

FIG. 2 illustrates a method of synchronizing audio streaming and FIGS. 3a-3c illustrate the client buffers that may be used in an embodiment of the method. The method includes the operation of synchronizing clocks of the media server and a client device. The synchronization can take place using the Network Time Protocol (discussed in detail later) or another clock synchronization method used in networks, as in block 210.

Another operation is receiving an incoming media packet having a timestamp from a media server, as in block 220. The media packet can be received by the audio client from the audio server. One example of a network that may be used to send the packet between the server and client is an 802.11x wireless network but other types of wireless or wired networks (e.g. Ethernet at a sufficient speed) may also be used.

When the client receives the media packet, then the client can compare the timestamp of the packet being received with the time that the next frame of data will actually be played out on the device or Next Play Time (NPT), as in block 230. The incoming media packet can be placed into the user buffer at a playing position in the user buffer based on the (NPT), as in block 240. Incoming media packets can then be played using a media output device 302 (FIG. 3) accessible to an end user, as in block 250 (FIG. 2). For example, the end user will then be able to hear the audio using a speaker and/or view any video that might be displayed on a video screen.

Referring to FIG. 3a, the NPT (Next Play Time) is defined by the number of packets to be played in the kernel buffer 304, the number of packets in the user buffer 306, and the current system time. If the timestamp for the incoming packet is located within the expected window for the NPT, then the packet is added into the play queue at the appropriate position as illustrated in FIG. 3b where the first packet 310 in a stream is shown being inserted into the appropriate location based on its timestamp. The first packet in the stream is placed into the user buffer with a defined amount of quiet time before it begins to play. This allows the stream to start playing without any stuttering or jitter.

FIG. 3c shows the user buffer after a number of packets have been added into the user buffer. Then an additional incoming packet can be added to the end of the queue if the timestamp is within the appropriate time window as compared to the NPT at the end of the queue. In short, the incoming media packet is placed into the user buffer at a time position in the user buffer based on the timestamp of the incoming media packet as compared to the client clock and the NPT, keeping in mind that the client and server clocks are synchronized, and the server clock is used to set the packet timestamp.

Since each of the clients have different playout clock crystals, each of the clients can calculate a drift co-efficient based on the expansion or contraction of their user buffer 306 as more packets are added and played. This drift co-efficient can be used to independently adjust the client's timing by upsampling or downsampling. In addition, each client may also re-sample the incoming data to convert the data sample rate to match the sampling rate used by the user queue and the kernel queue.

Since the clocks of all the devices are calibrated, then the clients may play the media packets to within a predefined number of milliseconds of each other. For example, +/−20 milliseconds is within a tolerance that enables the media streams to sound like each client is playing the media stream at exactly the same time. However, other tolerance ranges may be used.

The system illustrated in FIGS. 3a-c, further illustrates that packets are frequently transferred from the user buffer to the kernel buffer to enable the packets to be played using an audio speaker for the client. A kernel buffer process can be configured to frequently move available packets from the user buffer to the kernel buffer. The kernel buffer process can check the user buffer at defined periodic intervals and/or whenever there are available processor clock cycles.

These separate buffers enable the system to be paused more quickly and easily. Once packets are put into the kernel buffer they cannot be revoked and will be played by the output hardware. However, if a user presses the pause button in one client or at the server, then a packet is sent via the server to flush the entire user buffer on each client. As a result, the kernel buffer will play silence until more data is sent to the user buffer.

Figure 4:
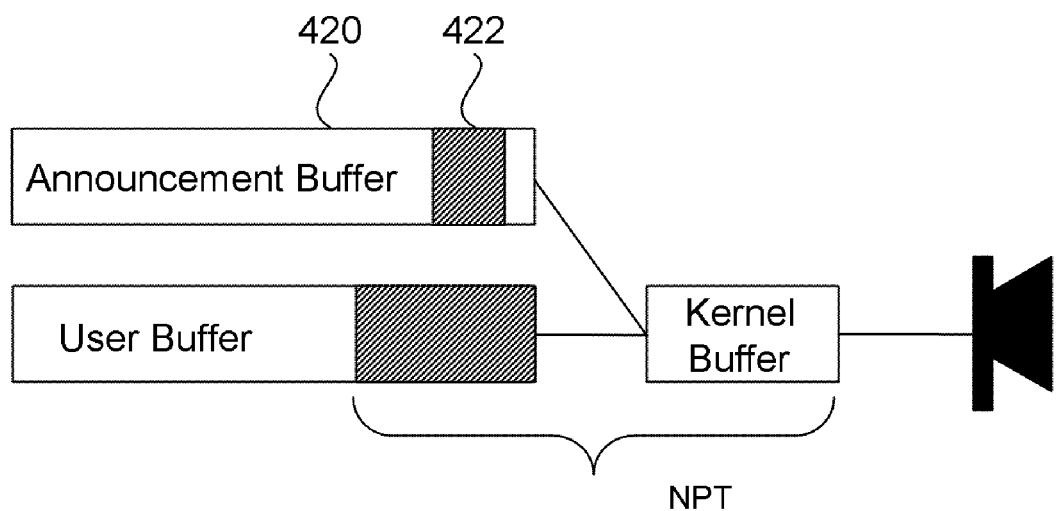
FIG. 4 is a block diagram illustrating an announcement buffer that is used with a user buffer in an embodiment of a client device.

The streaming media system can also include an announcement buffer as illustrated in FIG. 4. Announcements or brief audio segments mixed with existing audio streams are handled by the audio client on a separate TCP port. The announcements can be messages such as the doorbell, voice announcements, an intercom or synthesized error messages. When audio data is sent to this port, the announcement data is played on the specified audio output. If a stream is currently running on that output, its volume is "ducked" while the announcement plays, and synchronization of the main stream is not interrupted. The term "duck" is generally defined here to mean that the announcement is either blended into the main stream at some ratio or that the announcement stream replaces the main stream for a short duration. For example, the announcement stream may be mixed at 75% of its original volume and the main stream may be mixed at 25% of its original volume.

FIG. 4 illustrates that the announcement media packets 422 can be received into an announcement buffer 420 and be provided with some minimal amount of quiet space before the announcement. Announcements may or may not be synchronized like typical media streams, the announcements are put right into the queue without checking the timestamps. In the case of unsynchronized announcements, this means that the server does not throttle the announcements like it does the other media streams. Of course, an embodiment with synchronized announcements can be provided, if desired.

The kernel process can periodically check to see if packets are in the announcement buffer. If packets are in the announcement buffer, then the announcement media packets can be mixed with packets from the user buffer and placed into the kernel buffer to be played. A quiet period can be inserted before and/or after the announcement packets. Providing a quiet period surrounding announcements helps the end user to better understand the announcements.

Figure 5A:
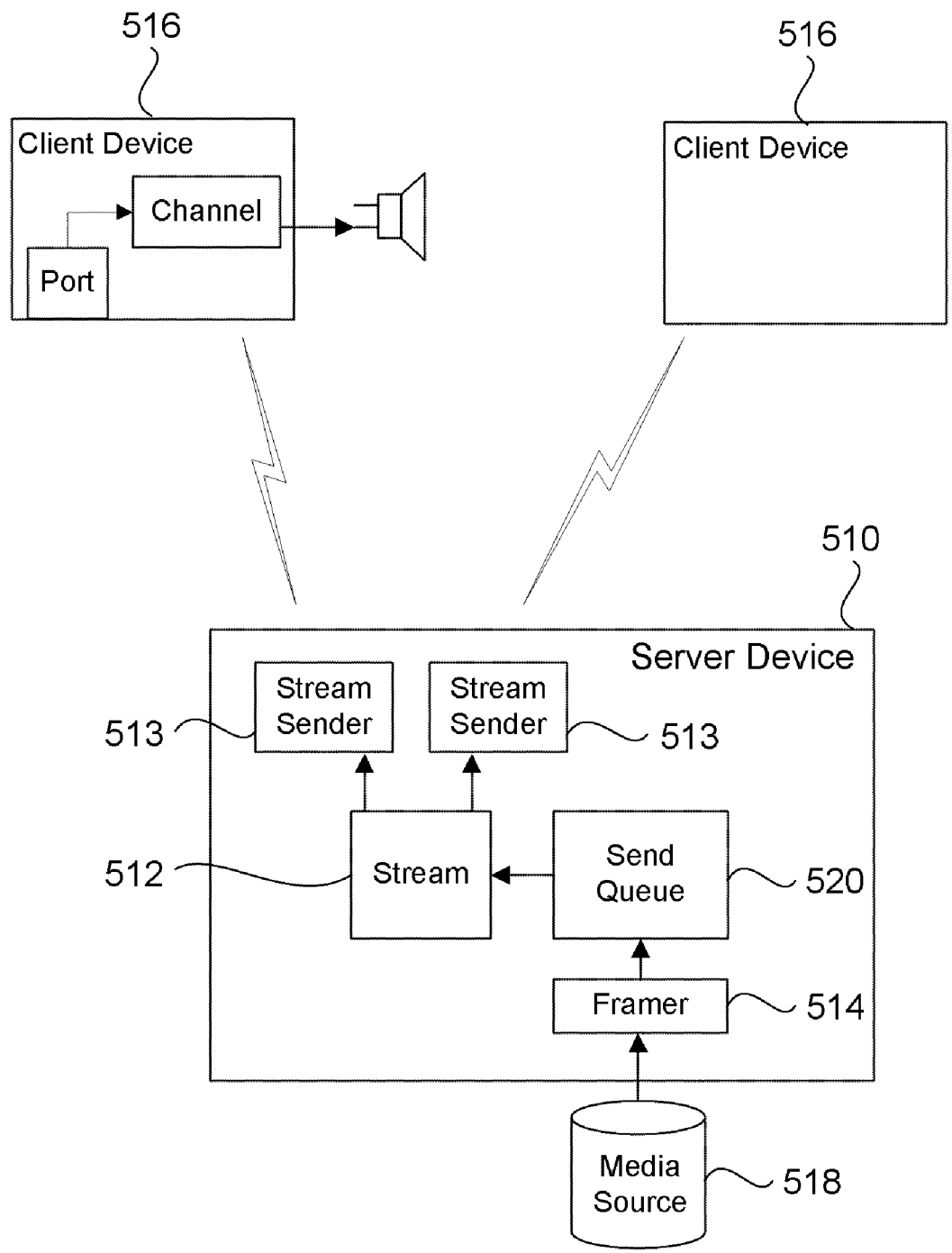
FIG. 5*a* is a simplified block diagram illustrating the use of a send queue in a server system in an embodiment.

FIG. 5a is a simplified block diagram illustrating the use of a send queue in a server device. The server device 510 is configured to prepare a media stream for presentation to an end user through a client device. A media stream 512 is configured to send out media packets to multiple clients at periodic clocked intervals through stream senders 513. The stream senders can send the media packets out using either a wireless or wired medium. The clocked intervals may be set to send out packets at the speed the media stream is expected to playback.

A framer 514 is located with the media server to divide the media stream into media packets. The framer can receive a media stream from a media source, such as an audio source 518. A media client device 516 can receive the media packets for the media stream from the stream sender 513 through a media port.

A send queue 520 can be provided in the server. The send queue may be configured to store a defined length of programming from the media stream. This means that at any point in time the send queue will contain packets that cover a time window for the media program. For example, 3 seconds of audio and/or video can be contained in the send queue. The audio server can then use the send queue to immediately fill a client's user buffer when an activation event occurs.

Examples of activation events include a startup event or a reset event. When a startup event is received by the server from a client, then all the playable media stream information in the send queue can be sent to the client device immediately. In other words, the data from the send queue is sent to the client device without a clocking delay to allow the client device to startup quickly without waiting for a series of packets to be sent through the normal clocking cycles.

The send queue may also have housekeeping or garbage collection applied from time to time. This means that as the time to play passes and the packets are not usable, then the packet can be erased or marked to be overwritten. As a result, the send queue can be implemented as a ring buffer or another configuration.

Figure 5B:
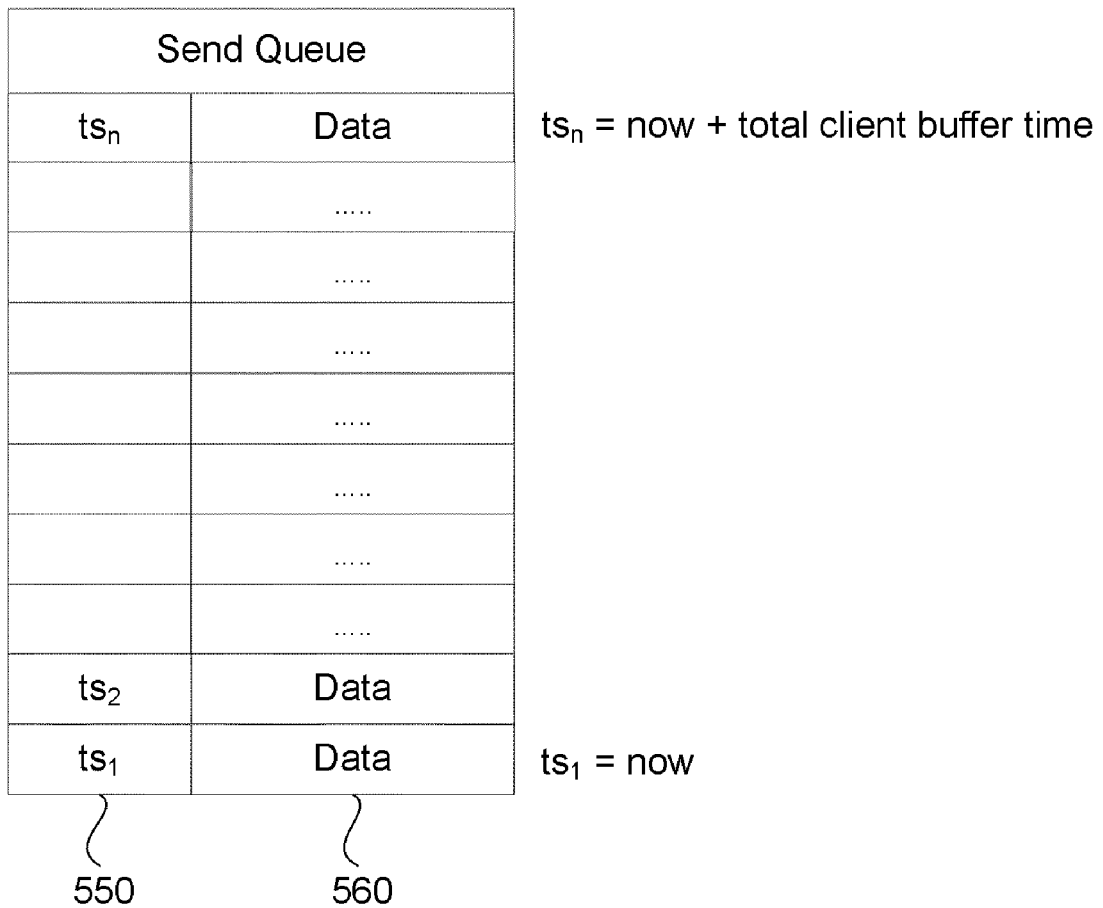
FIG. 5*b* illustrates an example configuration of a send queue.

FIG. 5b illustrates an example configuration of a send queue. Each packet in the send queue buffer can have a timestamp 550 and then a data payload 560. The buffer may include a queue of packets that starts at a given time represented by $ts_1$ which is the timestamp for the current time or "now." Then packets may be contained in the send queue that is contained within a few second window of "now", and this is depicted as the packets ranging up to $ts_1$ or "now plus the total buffer time."

The following discussion describes an example of time synchronization. Unlike most media streaming applications, which are concerned with synchronizing media from different sources, such as audio and video, and combining them into a synchronized presentation for a single client (or multiple clients in separate physical locations), the server may present a single media stream to a group of clients in the same physical area, which may be at various network distances from the server. If all clients in the group begin media output as soon as their stream buffer is ready, there may be audible or even visible artifacts in the sound or video when a listener or viewer receives the output from two or more clients, such as when the receiving party is positioned between two rooms.

Even if all of the audio clients are precisely synchronized, there is a delay associated with the distance between the listener and the sound source on the order of 0.9 ms/ft, due to the speed of sound in air. In a large home, this natural spatial delay could be as much as 30 or 40 ms between rooms, and it is desirable that the audio streaming subsystem does not introduce additional delays of this magnitude. The design goal for a time synchronization module is to keep clients synchronized to within a few multiples of the Linux system clock granularity (10 ms).

Network Time Protocol (NTP) can be used to synchronize the system clocks between all audio servers and clients. One system (the one running director software) can be setup as the master NTP server, and all other systems on the local network will be configured to synchronize to that server. The master system may also be synchronized to an external NTP server, but will fall back to its own system clock if network connectivity is interrupted or unavailable. If the time is set manually on the master system, clients will be notified to reset their clocks immediately, rather than wait (possibly many hours) for the NTP clients to re-sync their clocks. This will minimize the effect of time setting on audio streaming, although ample warning should be given to users that setting the system clock may result in temporary loss of audio synchronization.

One advantage of NTP is the ability to adjust clock skew parameters in the kernel, so the clocks on each system are not continuously drifting and being bumped forward or back by large increments. After a settling-in period, a drift correction factor is automatically calculated for each system, and written to a drift file that preserves the setting between re-boots.

The standard NTP implementation may have disadvantages that make an alternate synchronization technique attractive. First, the size of the executable program for synchronization may use over 2 MB of memory. This is a potential problem on small "embedded" devices such as an audio output device that does not have swapping capability. Second, NTP can take a significant amount of time to "stabilize" the system clock (on the order of tens of minutes or even several hours when network latency varies wildly, like in a poor Wi-Fi environment). This is especially true for devices just "out of the box", whose local drift settings have not yet been tuned by the NTP daemon. Two other techniques may also be used for time synchronization: 1) Reference Broadcast and 2) a subset of NTP tailored to the needs of the audio client and server.

The following discussion describes two network protocol modules and a utility class that can be shared between the audio server and audio client. Audio Stream Control Protocol (ASCP) is a simple protocol for handling requests and responses between audio clients and audio servers, and for controlling the audio streaming system from outside applications like a director software program. The director software is a program that is configured to control, route, and convert the many inputs that may enter a server. ASCP is an ASCII text protocol, and the commands, responses, and data are sent as lines of text terminated with <CR><LF>. This allows terminal access to the server and clients for testing and debugging.

Tokens in command and response lines are case-insensitive and are separated by white space. Commands must be prefixed with an alphanumeric tag, such as "A001", generated by the client, and responses to that command are then prefixed with the same tag. If the tag or command is missing, the response is tagged with a "*". Command parameters are separated by white space (and quoted if they contain spaces) and are case-sensitive.

Messages that are not associated with a command can be returned by the server, and are prefixed with the tag "SYS", which indicates that the data is an "out of context" system message such as a low memory warning, or an informational message such as "EOM" (end of media). Command completion is indicated by responses with response codes as the first token after the tag, followed by the name of the command: OK, NO, or BAD.

One limitation of some previous audio server/client designs has been the reliance on raw RTP packets sent over UDP. UDP can make it easy for the client to read individual audio frames and pass them to the decoder. However, using a standard RTP header, which has no length field, can make the server send one packet at a time. Sending very small packets (one frame of audio data) at a high frequency may be problematic on 802.11 networks, where the throughput may be good, but the latency when sending periodically to a particular client may be very high. This problem can be aggravated by frequent 802.11 multicasts and Address Resolution Protocol (ARP) traffic, which causes frequent rate shifting in a WiFi network. The improved protocol allows a variable number of frames to be sent to clients at one time and can significantly improve streaming over 802.11 networks.

By using TCP for the data connection and using the Audio Stream Protocol (ASP) defined here, the server can be configured to send a variable numbers of frames, and the frames can be delimited by the protocol so it is not necessary for the client to re-frame the received data before passing it to the decoder. In one example embodiment, the ASP protocol header may have a 100 microsecond resolution timestamp, payload type, and sequence number, plus client control information and a length for the entire frame group. Each frame in the group is preceded by a two byte frame length, so the client can easily pull one frame at a time from the stream and pass it to the decoder.

The AsyncIOMultiplexer class allows for fine-grained control of input and output in each type of subclass (ASCPHandler, Server, and Client), but handles the details of selection and file descriptor sets, closing sockets on errors, etc. The AsyncIOMultiplexer eliminates the large, complex select loop that would otherwise be required to multiplex the audio server or client.

The ASCPHandler class is a subclass of AsyncIOMultiplexer, that is setup to receive and tokenize ASCP commands from a client connection, map them to the internal command table, and call handleCommand( ) in the AudioServer and AudioClient main objects. All details of the external ASCP command protocol are handled in this class, so that the protocol may be changed without affecting the various client and server objects that implement commands. A number of classes used in the audio server and client are simple subclasses of AsyncIOMultiplexer that are set up as listening sockets and override the handleAccept( ) command. They are used to establish remote connections.

Audio Server

This section describes an example design of the audio server in more detail. The audio server is a daemon process, started automatically at system initialization, and runs on any home automation device or computing device that can be used as a media source.

Figure 6:
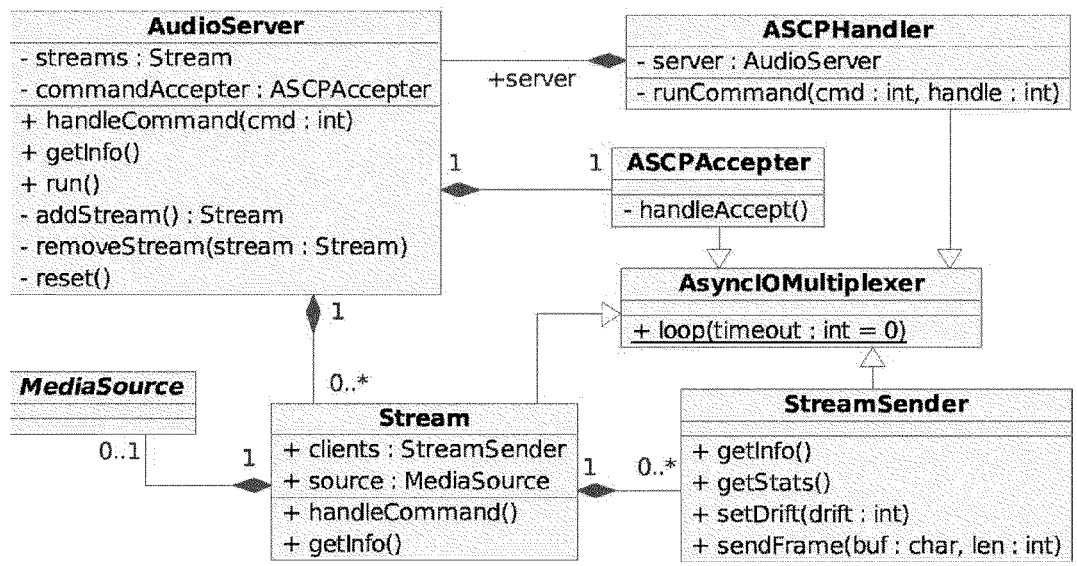
FIG. 6 illustrates a software module that can be used in an embodiment of a server system.

Referring to the UML class diagram in FIG. 6, the main object in the audio server (first object to be instantiated) is the AudioServer. The AudioServer creates a single ASCPAcceptor object derived from the AsyncIOMultiplexer class, and its run( ) method runs the loop( ) function in the AsyncIOMultiplexer class. The ASCPAcceptor listens for incoming connections on a port (e.g., port 6000).

Stream objects represent a single Media source streaming to one or more audio clients. The AudioServer adds one or more Stream objects, and adds a StreamSender object to the Stream for every audio client that will receive the stream data. StreamSender objects are derived from AsyncIOMultiplexer, and are consequently added to a global socket map for I/O. AudioServer maintains a list of Stream instances, and passes non-AudioServer commands from the ASCPHandler to the correct Stream object.

Media is then associated with a Stream by calling a method in the Stream that creates a MediaSource object implementation based on the file or device type passed in the media URL. MediaSource objects provides a frame reading method, and may also provide position control methods, as well as information about the audio samples that are needed to build ASP headers.

On an incoming connection, an ASCPHandler object is created by CommandAcceptor, which handles incoming ASCP commands in a server control session. The ASCPHandler then maps the incoming command to a command table, and calls the handleCommand( ) function in AudioServer. If the command is a Stream command, it is passed to a Stream object identified in the command. If it is one of the following AudioServer commands, it is handled by the AudioServer: (1) addStream( )—Adds a new stream to the server; (2) removeStream—Removes a stream from the server. This removes all objects associated with the stream (StreamSenders and MediaSources); (3) reset( )—Removes all Streams from the server.

Figure 7:
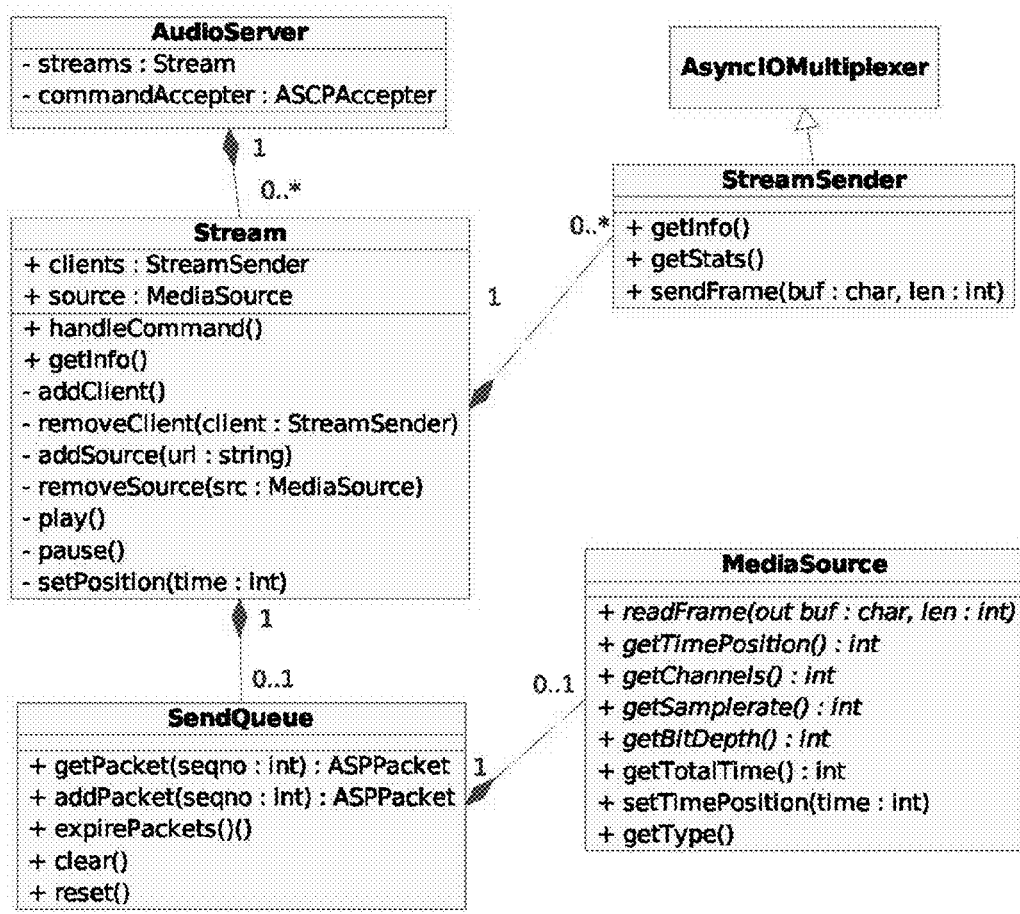
FIG. 7 illustrates software modules that can be used for a signal media stream source for one or more clients in an embodiment.

The Stream object (FIG. 7) represents a media stream from a single media source to one or more audio clients. One embodiment allows multiple sources to be "mixed", or combinations of sources such as audio and video components to be presented as a single stream. Like AudioServer, Stream objects have a public handleCommand( ) method and getInfo( ) method.

StreamSender objects are created by Stream objects, and represent a connection to a remote audio client (end point). StreamSender is derived from the AsyncIOMultiplexer class, and AsyncIOMultiplexer functions are used to send data to remote clients.

The Stream object requests a frame of data from the send queue, which either gets the next frame from the queue or reads a new frame from the Media Source. It then sends the data by calling SendFrame in each StreamSender. The Stream object also contains logic for timing out disconnected or high-latency clients, so they do not block packet transmissions to the entire client group. The statistics module may provide additional statistical functionality and it may use a callback to the Stream object.

Figure 8:
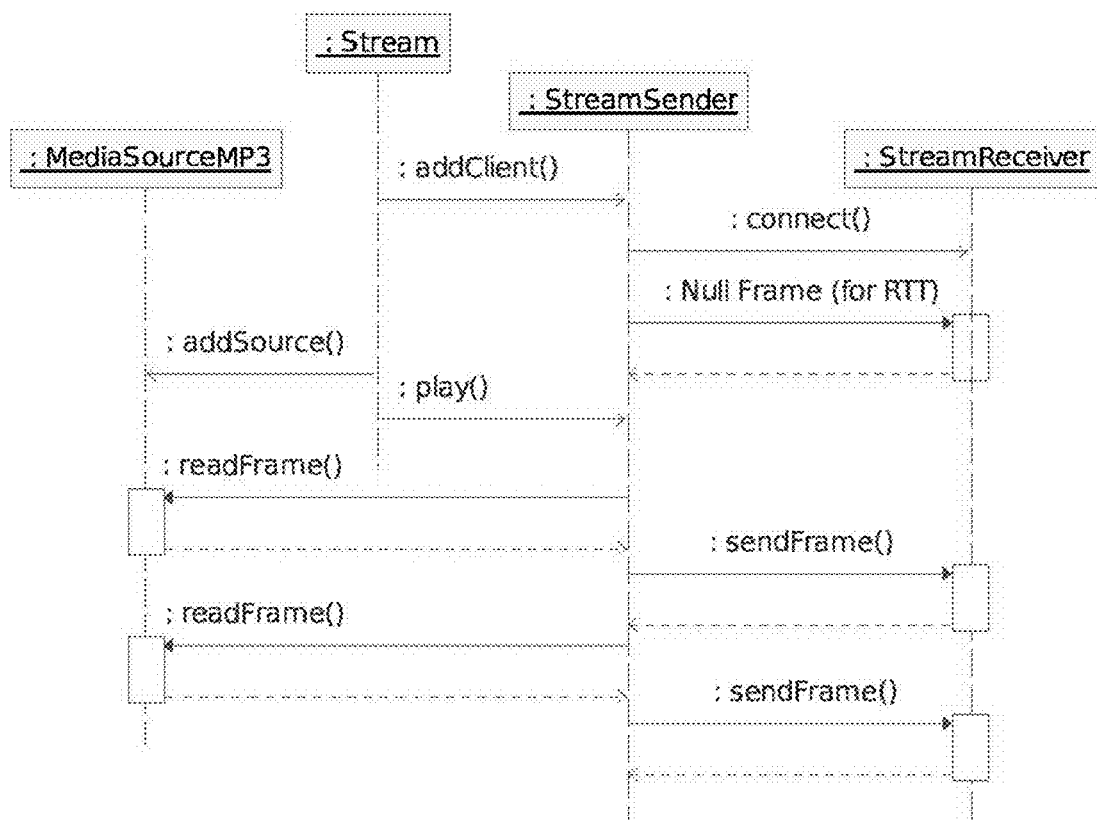
FIG. 8 illustrates software modules configured to open, close, and read different types of media in an embodiment.
Figure 9:
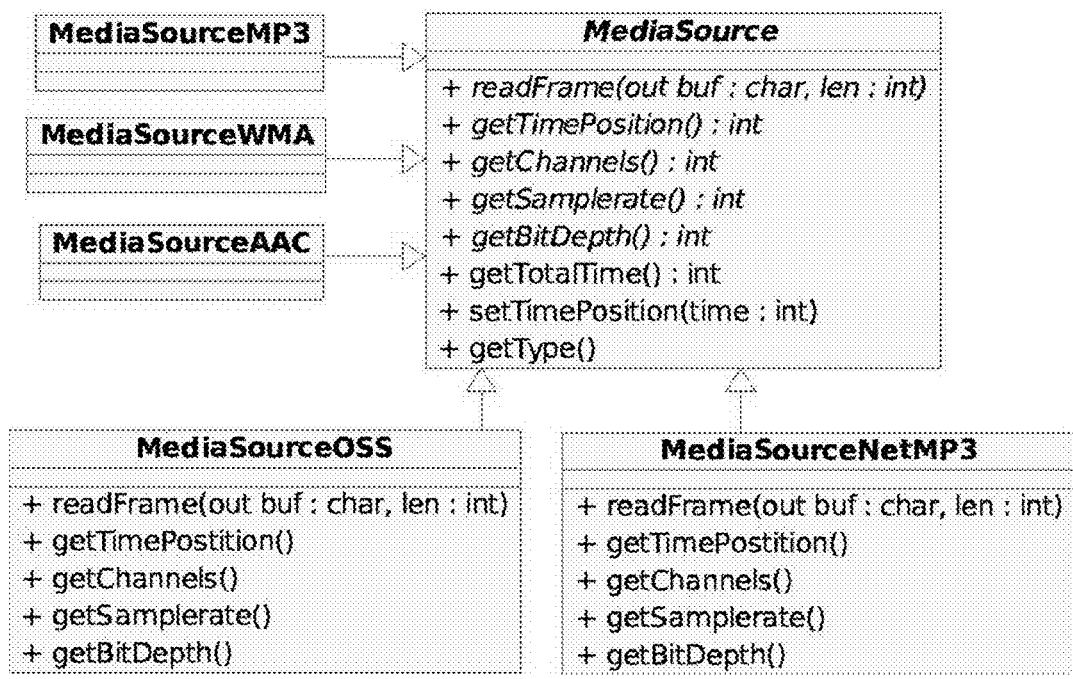
FIG. 9 is a block diagram illustrating media source software modules in an embodiment.

The MediaSource object in FIG. 9 illustrates example functions used for opening, closing, and reading different types of media, for retrieving the audio parameters of that media, and for positioning (seeking the media) in the Stream. Subclasses can be use to provide this functionality for multiple media types, such as MP3 files, M4A files, AAC audio stream, WMA files, OSS audio devices (dev/dspX) on Linux, and MP3 streams on HTTP servers (i.e., Internet radio). This may include an analog input channel (or microphone) using the DSP device. In the case of audio files, the files may reside on a mounted local file system or network share. See FIG. 8.

Audio Client

The design of an embodiment of the audio client will now be described in more detail. Like the audio server, the client can be a daemon process that is started automatically at system startup and runs on any client computing device or home automation device that has an audio playback device.

Figure 10:
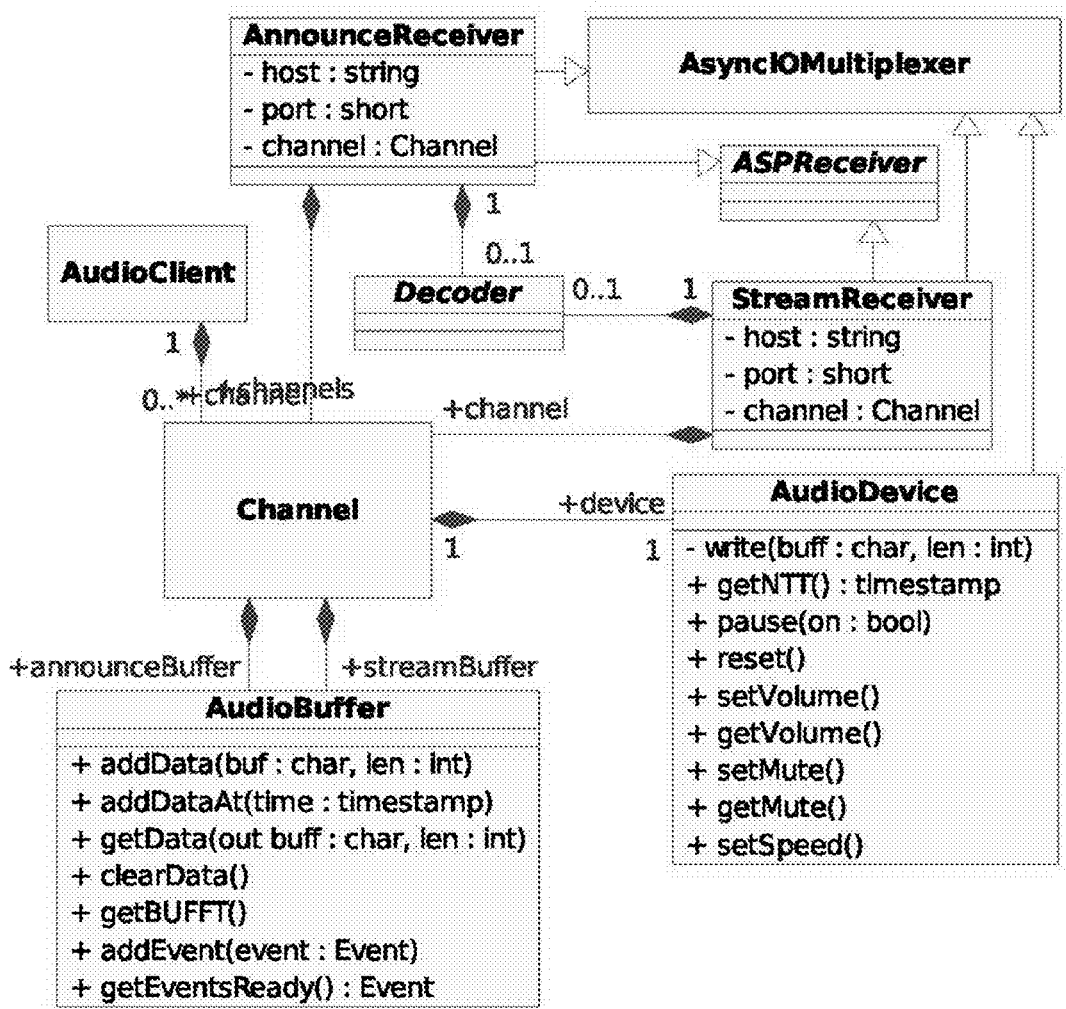
FIG. 10 illustrates software modules configured to manage connections made to the client stream or announcement ports in an embodiment.

The audio client can run on one or more platforms like a media controller device or home theater controller device, or on a dedicated network audio I/O device like a speaker device. The design is modular, so that devices with multiple audio channels can run the audio client as a single process or as individual processes for each channel. Referring to FIG. 10, AudioClient may be the first object instantiated on startup, and creates an ASCPAcceptor object to listen for incoming connections on the client control port (e.g., 6100). As with the server, an incoming connection to ASCPAcceptor creates an ASCPHandler object which parses the incoming command and calls handleCommand( ) in AudioClient. AudioClient may then create a Channel object for each audio channel available on the device.

The Channel object handles the per-channel client commands passed to it by AudioClient, and may create several more per-channel objects, for example:
 1. A StreamAcceptor to listen for incoming ASP audio stream data.
 2. An AudioBuffer object for stream data.
 3. An AnnounceAcceptor to listen for incoming ASP announcement data.
 4. An AudioBuffer object for announcement data.
 5. An AudioDevice object which provides an interface to the audio device driver.

AudioClient Object

The AudioClient in FIG. 10 may be the top-level object in the audio client process. After creating the ASCPAcceptor object and initializing one or more channels, the run( ) method is called, which calls the global AsyncIOMultiplexer loop( ) function and starts the audio client. The only command handled by AudioClient is getInfo( ), which returns getInfo( ) for each channel in the channel list. All other commands are passed to the appropriate Channel object.

Channel Objects

Each channel object can represent a physical audio device, and holds Acceptor and AudioBuffer objects for stream and announcement data. Channel objects implement the handleCommand( ) and getInfo( ) methods. One of the key functions of the Channel object is to provide persistence of the AudioDevice and AudioBuffer objects when the StreamReceiver or AnnounceReceiver connections are closed or changed. The Channel objects can exist for the life of the AudioClient, and each incoming stream or announcement connection closes any existing connection and becomes the "owner" of the channel object. This allows the connection to be switched seamlessly as long as there is enough data in the AudioBuffer object.

Streams and Receiver Objects

When a connection is made to the stream or announcement ports, the StreamAcceptor and AnnounceAcceptor objects create a StreamReceiver and AnnounceReceiver object, respectively as in FIG. 10. These objects are subclasses of the ASPReceiver class, which is an AsyncIOMultiplexer object that receives ASP packets and parses ASP headers.

StreamReceiver Object

The StreamReceiver object can receive incoming ASP packets for the main audio stream. StreamReceiver may then instantiate a Decoder object for the ASP Frame Type (if it is not already instantiated), and passes the frame(s) to the Decoder's decoding method. The PCM output is then added to the stream's AudioBuffer object using the addData( ) method, which queues it for transfer to the AudioDevice. If a non-zero drift factor has been calculated due to growing or shrinking of the audio buffer, the output from the decoder is first expanded or contracted by adding or removing samples according to a drift correction algorithm based on the sample rate. Data is then automatically transferred to the audio device when the audio device is able to accept another frame of data. Depending on certain flags in the ASP header, the behavior of the StreamReceiver may be altered as follows:
 1. The decoder may be reset if the playnow flag is set or when a client is joining a session in progress.
 2. If the null flag is set, the Audio Buffer is cleared and this stops playback quickly (i.e., as soon as the data in the kernel buffer is played out).

The AnnounceReceiver object can receive incoming ASP packets on the announcement socket. Like StreamReceiver, a Decoder object is instantiated as necessary, and the frames are decoded and sent to the announcement AudioBuffer using addData( ). The first frame of a new announcement is put in AudioBuffer using addDataAt( ), which places the first frame of the new announcement at the soonest possible play position. Unlike StreamReceiver, no drift correction is applied. The stream is terminated by closing the announcement connection.

When the mixing code in the AudioDevice object can find data in the announcement buffer, the AudioDevice object executes the mixing code, ducking the data being transferred from the main stream buffer. Correspondingly, when the announcement socket is closed and the announcement buffer is emptied, the ducking is stopped.

If an announcement connection is made while a previous announcement is still playing, the announcement is added to the queue using addDataAt( ), clearing any old announcement data commencing at that time position.

The AudioDevice (see FIG. 10) is a class for interfacing to the DSP audio device on the client system, including setting the codec sample rate and controlling the volume. AudioDevice objects are a subclass of AsyncIOMultiplexer, using the file descriptor of the audio driver instead of a socket in the select set. Calling a write select( ) on the audio device will return ready when at least one complete fragment of audio data can be written to the device. This makes it convenient to implement AudioDevice as an AsyncIOMultiplexer and override the handleWrite( ) method to perform the transfer of data from the stream and announcement AudioBuffer objects to the audio device.

When no data is available in either of the AudioBuffer objects, the transfer routine writes silent data to the audio device. This keeps the device playing at all times, if desired, and eliminates the clicks and pops that occur when the device is started and stopped.

The transfer routine in AudioDevice contains code for mixing announcement data with stream data (and possibly re-sampling the announcement data) at the time each fragment is transferred to the device. Since audio quality is not as important for announcements, the mixing algorithm will be chosen for high efficiency, and may be as simple as sample summing with the ducked stream data. The function of the mixer is controlled by the presence or absence of data in the announcement AudioBuffer.

Audio Buffering and AudioBuffer Class

Buffering is valuable in a streaming audio system to prevent dropouts in the audio output when the network connection experiences temporary pauses, or when other software running on either the server or the client performs large amounts of I/O, momentarily taking up system resources and causing jitter in the delivery of the audio stream.

In an embodiment, the audio client makes use of two buffers for audio data: 1) The kernel-level device buffer, and 2) the user-level main buffer. In the past, audio clients have used a single, large device buffer, which eliminated the allocation and management of a user-level buffer, but resulted in large delays when the stream was started or stopped, as the buffer always had to be filled or emptied autonomously by the kernel. The use of a single, large device buffer also presented problems when the sample rate of the data was changed between songs, since the audio client had to estimate when the first sample at the new sample rate was being played, and switch the codec sample rate at that time.

In the present technology, the kernel buffer is kept as small as practically possible, so that the response to play and stop commands is more immediate. The buffer can be large enough to prevent under-runs during heavy I/O (disk, frame buffer, etc.) in the kernel.

The user-level main buffer can be where incoming data is stored in an embodiment, before being passed to the kernel buffer. In previous systems, the synchronization scheme has relied on counting the number of fragments in the kernel buffer, and each incoming MP3 frame was immediately decoded and passed to the buffer. This tied the kernel fragment size to the size of an MP3 frame (4608 bytes), which was inefficient since two pages of memory were required for each frame. The improved main buffer design can allow the kernel fragment size to be set to any multiple of the page size, since an arbitrary number of bytes from the main buffer can be transferred to the kernel buffer. Also, since the transfer of frames into the main buffer is separate from the transfer of bytes from the main buffer to the kernel buffer, frames of arbitrary length (i.e. AAC) can be handled by the client, and any number of frames can be sent at the same time (in a single ASP packet), which significantly reduces the network overhead for formats with short frame lengths.

While the term home automation is used herein, these electronic components that have been described can be used with the central controller in other settings, including business, education, government, hotels, churches, broadcasting and entertainment facilities.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A streaming media system configured to prepare the streaming media for initial presentation, comprising:
   a media server configured to send out media packets for a media stream at periodic clocked intervals;
   a framer located with the media server to divide frames of the media stream into media packets;
   a media client configured to receive the media packets for the media stream from the media server;
   a send queue in the server, the send queue being configured to store a defined length of programming from the media stream, wherein the send queue can immediately fill a client's user buffer when an activation event occurs by transferring multiple frames in a single packet.

2. The system as in claim 1, wherein the activation event in the client device is a startup event or a reset event.

3. The system as in claim 1, further comprising a garbage collector configured to erase an unusable media packet in the send queue.

4. The system as in claim 3, wherein the garbage collector marks unusable media packets to indicate that the media packets will be overwritten.

5. The system as in claim 1, wherein the framer receives the media stream from a media source.

6. The system as in claim 1, wherein the media server sends media packets to a plurality of media clients.

7. The system as in claim 1, wherein the media client comprises a plurality of media clients which present the media stream to an end user across a plurality rooms without noticeable delay between the plurality of rooms.

8. The system as in claim 1, wherein the periodic clocked intervals are set such that the media server transmits the media packets to the media client at an expected speed of media playback.

9. The system as in claim 1, wherein the media server communicates with the media client over a wired network.

10. The system as in claim 1, wherein the media server communicates with the media client over a wireless network.

11. The system as in claim 1, wherein the media server communicates with the media client using an audio stream control protocol.

12. A method of preparing an audio streaming system for initial presentation of a media stream, comprising:
   loading a send queue in a media server with a defined length of programming;
   receiving an activation event at a media server from a client device;
   sending the defined length of programming in the send queue to the client device in an asynchronous manner without a clocking delay to allow the client device to startup quickly without waiting for a series of packets to be sent through clocking cycles;
   receiving the defined length of programming into a user queue in the client device; and
   playing the programming from the user queue in a media output device accessible to an end user.

13. The method as in claim 12, wherein the activation event in the client device is a startup event or a reset event.

14. The method as in claim 12, further comprising erasing unusable programming in the send queue, when the unusable programming is identified by a garbage collector.

15. The method as in claim 12, further comprising overwriting expired programming in the send queue, wherein a garbage collector has marked the programming.

16. The method as in claim 12, wherein sending the defined length of programming comprises sending the defined length of programming at periodic clocked intervals, wherein the periodic clocked interval is set so that the media server transmits the media packets to the client device at an expected speed of media playback on the media output device.

17. The system as in claim 12, wherein the media server communicates with the media client over a wired network.

18. The method as in claim 12, wherein the media server communicates with the media client over a wireless network.

19. The method as in claim 12, wherein the media server communicates with the client device using an audio stream control protocol.

20. A streaming media system configured to prepare the streaming media for initial presentation, comprising:
   a media server configured to send out media packets for a media stream at periodic clocked intervals;
   a framer located with the media server to divide the media stream into media packets;
   a media client configured to receive the media packets for the media stream from the media server;
   a send queue in the server, the send queue being configured to store a defined length of programming from the media stream, wherein the send queue can fill a client's user buffer in an asynchronous manner without a clocking delay when an activation event occurs.

* * * * *

UNITED STATES PATENT AND TRADEMARK OFFICE
CERTIFICATE OF CORRECTION

PATENT NO. : 8,375,137 B2
APPLICATION NO. : 12/507754
DATED : February 12, 2013
INVENTOR(S) : Timothy D. Bowman Page 1 of 1

It is certified that error appears in the above-identified patent and that said Letters Patent is hereby corrected as shown below:

In the Specification

In column 6, line 11 please delete "to $ts_1$" and replace it with --to $ts_n$--.

Signed and Sealed this
Twenty-sixth Day of November, 2013

Margaret A. Focarino
*Commissioner for Patents of the United States Patent and Trademark Office*